United States Patent [19]
Notsu

[11] Patent Number: 6,094,011
[45] Date of Patent: Jul. 25, 2000

[54] DISCHARGE LAMP LIGHTING DEVICE DRIVEN BY INTERNAL COMBUSTION ENGINE

[75] Inventor: Tooru Notsu, Numazu, Japan

[73] Assignee: Kokusan Denki Co., Ltd, Shizuoka-Ken, Japan

[21] Appl. No.: 08/668,691

[22] Filed: Jun. 24, 1996

[30] Foreign Application Priority Data

Jun. 26, 1995 [JP] Japan .................................... 7-159125
Feb. 27, 1996 [JP] Japan .................................... 8-039811

[51] Int. Cl.⁷ ...................................................... H02P 9/00
[52] U.S. Cl. .................................. 315/78; 322/46; 322/28; 310/209; 310/198; 310/186; 310/70 R; 310/68 D; 310/153; 310/156; 307/10.8
[58] Field of Search .................................. 322/46, 28, 91, 322/8; 310/209, 198, 186, 73, 70 R, 68 D, 153, 156; 315/77, 78, 209 CD; 307/10.8, 66, 68; 40/591, 593, 548

[56] References Cited

U.S. PATENT DOCUMENTS

| | | | |
|---|---|---|---|
| 2,765,428 | 6/1956 | Campbell | 315/78 |
| 4,899,085 | 2/1990 | Kimura et al. | 315/116 |
| 5,598,065 | 1/1997 | Lakosky | 315/82 |

FOREIGN PATENT DOCUMENTS

55-27194 of 1980 Japan .
57-17513 of 1982 Japan .
5-87958 of 1993 Japan .

*Primary Examiner*—Arnold Kinkead
*Attorney, Agent, or Firm*—Pearne, Gordon, McCoy & Granger LLP

[57] ABSTRACT

A discharge lamp lighting device driven by an internal combustion engine is disclosed which is capable of lighting a discharge lamp without using a ballast constituted by a leakage transformer. The device includes a generator which is driven by the internal combustion engine and of which output characteristics exhibit drooping characteristics, so that an output voltage of the generator may be applied to a discharge lamp without using any ballast. Output characteristics of the generator are so set that an output voltage of the generator at a non-load state thereof may be higher than a break-down voltage of the discharge lamp, a short-circuit current of the generator may have a level sufficient to restrict a discharge current of the discharge lamp just after starting of discharge thereof to an allowable level or below, and a voltage across the discharge lamp and a discharge current thereof at a steady state thereof each are kept within a rated range.

5 Claims, 6 Drawing Sheets

DISCHARGE LAMP LIGHTING DEVICE DRIVEN BY INTERNAL COMBUSTION ENGINE

BACKGROUND OF THE INVENTION

This invention relates to a discharge lamp lighting device, and more particularly to a device for lighting a discharge lamp such as a mercury lamp, a metal halide lamp or the like.

A lighting device for lighting an illuminator such as an illuminator used in a construction site, that for leisure time amusement, that for disaster prevention or the like often uses a synchronous generator as a power supply therefor.

Recently, a discharge lamp such as a mercury lamp or the like has been extensively substituted for an incandescent lamp as an illuminator for a construction site or that for leisure. As widely known in the art, a discharge lamp has negative impedance characteristics. Thus, when the discharge lamp starts discharge once, it is decreased in impedance with an increase in discharge current; so that a failure in restriction on the discharge current causes the discharge current to be unlimitedly increased, leading to breakage of the discharge lamp. Thus, lighting of the discharge lamp requires arrangement of a ballast for restricting the discharge current within a suitable range.

A conventional discharge lamp lighting device driven by an internal combustion engine generally includes a synchronous generator driven by the internal combustion engine to induce an AC voltage, an automatic voltage regulator for controlling an output voltage of the generator in a manner to keep it at a set level, a speed control unit for controlling a rotational speed of the internal combustion engine, and a ballast for restricting a current fed from the generator to the discharge lamp, wherein the automatic voltage regulator controls so as to keep an output voltage of the generator at 100 V and the speed control unit controls a rotational speed of the internal combustion engine so that an output frequency of the generator is kept at a commercial frequency of 50 Hz or 60 Hz.

The ballast is constituted by a leakage transformer constructed of an iron core having an air space or gap at an intermediate of a magnetic path and primary and secondary coils wound on the core, wherein an output of the generator is applied across the primary coil of the transformer and the discharge lamp is connected across the secondary coil of the transformer.

Typically, the leakage transformer has a phase advancing capacitor for power factor compensation connected across the secondary coil thereof.

The leakage transformer functions to limit a discharge current of the discharge lamp to a predetermined level or below, because output-voltage to output-current characteristics thereof exhibit drooping characteristics which cause an output voltage thereof to be rapidly decreased with an increase in output current thereof to limit the output current to a predetermined level or below.

A discharge lamp lighting device in which a ballast constituted by such a leakage transformer is incorporated is disclosed in Japanese Utility Model Publication No. 27194/1980 (55-27194), Japanese Utility Model Publication No. 17513/1982 (57-17513), Japanese Patent Publication No. 87958/1993 (5-87958) and the like.

The conventional discharge lamp lighting device driven by an internal combustion engine, as described above, requires arrangement of the ballast between the generator and the discharge lamp, leading to an increase in cost thereof.

Also, the ballast acts as an inductive load, resulting in power factor thereof being deteriorated or reduced, so that arrangement of the ballast causes a burden applied to the generator to be disadvantageously increased.

Further, such arrangement of the phase advancing capacitor for power factor compensation at the ballast as described above exhibits a disadvantage of causing flowing of a leading current when the discharge lamp is lighted again after it is turned off once, resulting in an increase in magnetic flux flowing through an armature core of the generator, so that an output voltage of the generator is often excessively increased.

Arrangement of the ballast causes an inrush current increased to a degree about 1.5 times as large as a rated input current to be flowed through an armature coil of the generator during starting operation. Thus, when a rated output current of the generator is conformed to a rated current of the discharge lamp, the generator is rendered overloaded during the starting operation, to thereby cause an increase in voltage regulation, resulting in satisfactory lighting of the discharge lamp being often failed. In order to ensure satisfactory lighting of the discharge lamp, it is required to limit a voltage regulation of the generator to a range of +6%. This requires to construct the generator into a capacity increased sufficiently to provide a rated current 2 to 3 times as large as a rated current of the discharge lamp, leading to an increase in cost.

In particular, when it is desired to light a plurality of discharge lamps concurrently, the generator and the internal combustion engine for driving the generator are required to exhibit a highly increased capacity, leading to an increase in cost.

It would be considered to render an output of the internal combustion engine and a power capacity of the generator equal to the sum of rated consumption powers of a plurality of discharge lamps and light the discharge lamps in order. Unfortunately, this causes the reserve capacity of the generator to be reduced with an increase in the number of discharge lamps lighted, resulting in the generator falling into an overloaded state at the time of starting of discharge lamps subsequent thereto, leading to a failure in satisfactory starting of the discharge lamps. For example, supposing that four discharge lamps are to be lighted, when three discharge lamps are turned on in order and then the last or fourth discharge lamp is to be turned on, a starting current thereof causes the generator to be overloaded, resulting in a variation in voltage applied to the last discharge lamp being increased, so that lighting of the last discharge lamp is often failed.

SUMMARY OF THE INVENTION

The present invention has been made in view of the foregoing disadvantage of the prior art.

Accordingly, it is an object of the present invention to provide a discharge lamp lighting device driven by an internal combustion engine which is capable of eliminating a necessity of arranging a ballast constituted by a leakage transformer when a discharge lamp is lighted while using a generator driven by an internal combustion engine as a power supply therefor.

It is another object of the present invention to provide a discharge lamp lighting device driven by an internal combustion engine which is capable of concurrently lighting a plurality of discharge lamps without using any ballast.

It is a further object of the present invention to provide a discharge lamp lighting device driven by an internal combustion engine which is capable of reducing a rated capacity of a generator as compared with the prior art, to thereby accomplish down-sizing thereof and a decrease in cost thereof.

In accordance with the present invention, a discharge lamp lighting device, driven by an internal combustion engine is provided. The discharge lamp lighting device according to the present invention includes a generator driven by an internal combustion engine. The generator outputs a voltage, which is applied to a discharge lamp without using any ballast.

The generator is so constructed that output-voltage to output-current characteristics (output characteristics) thereof exhibit drooping characteristics. The output characteristics are set so as to satisfy conditions that an output voltage of the generator at a non-load state thereof is higher than a break-down voltage of the discharge lamp, a short-circuit current of the generator has a level sufficient to restrict a discharge current of the discharge lamp immediately after starting of discharge thereof to an allowable level or below, and a voltage across the discharge lamp and a discharge current thereof at a steady state thereof each are kept within a rated range.

When a discharge lamp which requires application of an increased break-down voltage thereto during starting thereof such as a metal halide lamp or the like is to be lighted, a starting circuit which is adapted to generate a high-voltage pulse during starting of the discharge lamp while using the generator as a power supply thereof is preferably arranged, so that an output pulse of the starting circuit is applied to the discharge lamp together with an output voltage of the generator. In this instance, an output voltage of the generator at a non-load state thereof is set at a level sufficient to keep a crest value of the high-voltage pulse above the break-down voltage of the discharge lamp.

Also, in accordance with the present invention, a lighting device for lighting a plurality of discharge lamps is provided. In order to light a plurality of discharge lamps, a generator is arranged which includes a multipolar rotor driven by an internal combustion engine and a stator provided with a plurality of discharge lamp lighting generating coils in a manner to be electrically independent from each other, so that output voltages of the discharge lamp lighting generating coils are applied to the discharge lamps, respectively. The stator of the generator is provided with a means for loosening coupling of magnetic circuits of the discharge lamp lighting generating coils to each other, to thereby restrain an armature reaction which causes the discharge lamp lighting generating coils to act on each other. In this instance, output characteristics of each of the discharge lamp lighting generating coils exhibit drooping characteristics and are so set that an output voltage of each of the discharge lamp lighting generating coils at a non-load state thereof is higher than a break-down voltage of the discharge lamp, a short-circuit current of each of the discharge lamp lighting generating coils has a level sufficient to restrict a discharge current of the discharge lamp immediately after starting of discharge thereof to an allowable level or below, and a voltage across the discharge lamp and a discharge current thereof at a steady state or thermally stable state thereof each are kept within a rated range.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, wherein.

DETAILED DESCRIPTION OF THE PREFERRED EMBODIMENTS

Now, a discharge lamp lighting device driven by an internal combustion engine according to the present invention will be described hereinafter with reference to the accompanying drawings.

Figure 1:
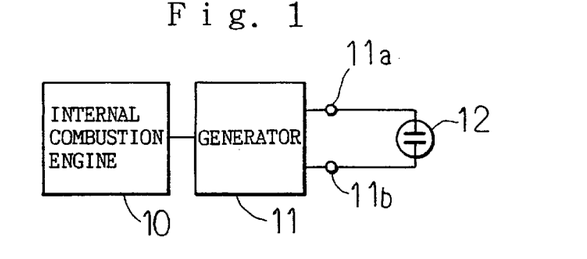
FIG. 1 is a schematic block diagram generally showing an embodiment of a discharge lamp lighting device driven by an internal combustion engine according to the present invention.

Referring first to FIG. 1, a first embodiment of a discharge lamp lighting device driven by an internal combustion engine according to the present invention is illustrated. In FIG. 1, reference numeral 10 designates an internal combustion engine, 11 is a generator driven by the internal combustion engine 10, and 12 is a discharge lamp such as a mercury lamp or the like. The generator 11 includes a pair of output terminals 11a and 11b having a voltage induced therebetween, which is applied across the discharge lamp. The generator 11 may be either a DC generator or an AC generator.

Figure 2:
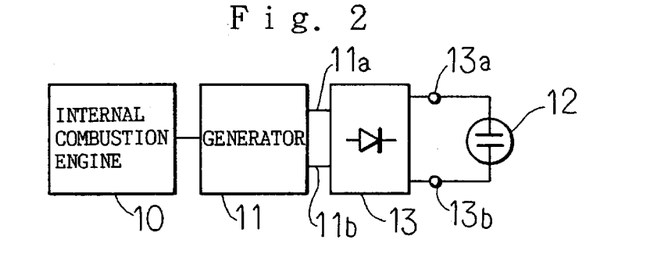
FIG. 2 is a schematic block diagram generally showing another embodiment of a discharge lamp lighting device driven by an internal combustion engine according to the present invention.

Referring now to FIG. 2, a second embodiment of a discharge lamp lighting device driven by an internal combustion engine according to the present invention is illustrated. In the illustrated embodiment, a generator 11 comprises an AC generator. A voltage outputted from the generator 11 is applied to a rectifier 13, so that the rectifier 13 induces a DC voltage between output terminals 13a and 13b thereof, which is then applied across the discharge lamp 12.

The discharge lamp lighting device of the present invention includes the generator 11 which exhibits output-voltage to output-current characteristics suitable for lighting the discharge lamp, to thereby either apply an output voltage of the generator 11 directly to the discharge lamp as shown in FIG. 1 or apply it through the rectifier 13 to the discharge lamp as shown in FIG. 2 without arranging any ballast.

The generator used in the present invention is constructed so as to permit output-voltage to output-current characteristics thereof to exhibit drooping characteristics. Output-voltage to output-current of the generator are so set that an output voltage of the generator at a non-load state thereof may be higher than a break-down voltage of the discharge lamp, a short-circuit current of the generator has a magnitude or level sufficient to limit a discharge current of the discharge lamp immediately after starting of discharge thereof to an allowable level or below, and a discharge voltage of the discharge lamp and a discharge current thereof at a steady state thereof each are kept within a rated range.

Figure 7:
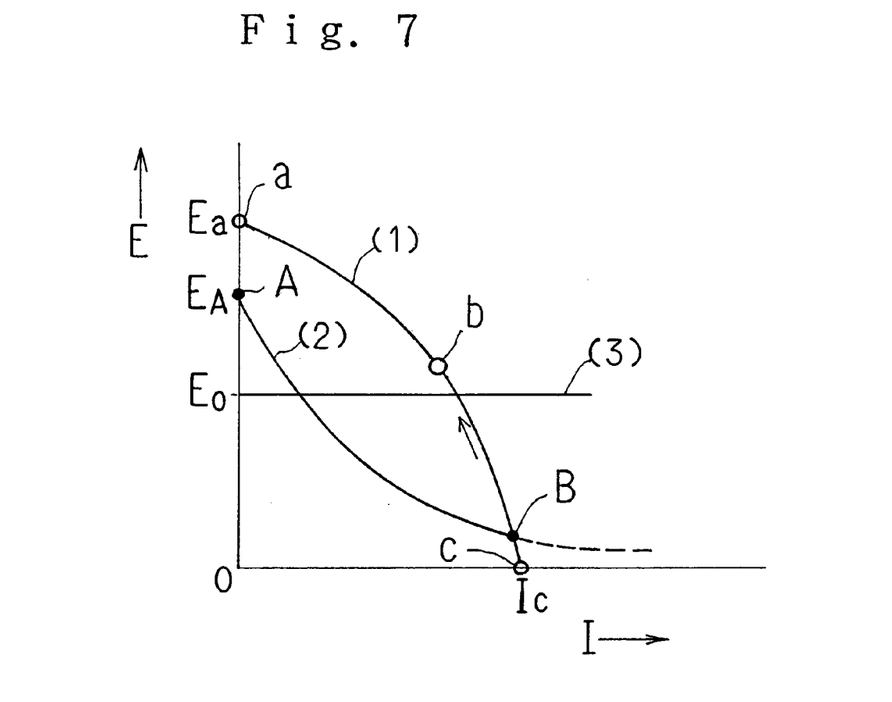
FIG. 7 is a graphical representation showing an example of each of output characteristics of a generator suitable for use in the present invention, terminal-voltage to current characteristics of a discharge lamp at a cold state thereof, and output characteristics of a generator incorporated in a conventional lighting device.

Output-voltage E to output-current I characteristics of the generator 11 suitable for use in the present invention are exemplified at a curve (1) in FIG. 7. A curve (2) in FIG. 7 indicates voltage to current characteristics of a mercury lamp at a state at which electrodes of the lamp are kept still cold (hereinafter referred to as "cold state"). The discharge lamp, as indicated at the curve (2), has negative impedance characteristics wherein a voltage across the lamp is reduced with an increase in discharge current.

A voltage EA at a point A on the curve (2) in FIG. 7 is a break-down voltage. In order to light the discharge lamp, it is required to apply a voltage of a level of the voltage EA at the point A or above across the discharge lamp. Thus, in the present invention, a voltage Ea of the generator at a non-load state (a voltage at a point a in FIG. 7) is set to be higher than the break-down voltage EA.

When the discharge lamp starts discharge, an impedance thereof is rapidly reduced and a discharge current thereof is increased to a point B at which it intersects the output characteristic curve (1) of the generator. The discharge current at the point B is a discharge current of the discharge lamp at a cold state thereof just after starting of discharge thereof. The discharge current right after starting of the discharge is determined depending on a short-circuit current of the generator and increased with an increase in short-circuit current. In view of the fact, in the present invention, a magnitude or level of a short-circuit current IC (a current at a point c in FIG. 7) is set so as to restrict the discharge current immediately after starting of the discharge (the voltage at the point B in FIG. 7) to a level allowable to the discharge lamp or below while permitting the output characteristics of the generator or the output-voltage to output-current characteristics thereof to exhibit drooping characteristics thereof.

An increase in temperature of the discharge lamp causes an increase in internal impedance thereof, to thereby decrease a discharge current thereof; so that when the discharge lamp reaches a thermally stable state (steady state), it is stabilized at an intersection between an impedance curve of the discharge lamp at that time and the output characteristic curve of the generator. In the present invention, output characteristics of the generator are set so that a voltage across the discharge lamp and a discharge current thereof (for example, a discharge current at a point b in FIG. 7) at a steady state or thermally stable state thereof each are within a rated range of the discharge lamp.

More specifically describing with reference to FIG. 7, in the present invention, characteristics of the generator are set so as to permit the output characteristic curve (1) to pass through the points a, b and c. Such setting of characteristics of the generator permits a discharge current of the discharge lamp just after starting of discharge of the discharge lamp to be restricted to an allowable level or below while starting the discharge without using any ballast and ensures a stable operation point at a steady state thereof.

The internal combustion engine 10 may be controlled so as to keep a rotational speed of the generator 11 substantially at a rated rotational speed. In the conventional discharge lamp lighting device, a rotational speed of the internal combustion engine 10 is controlled so as to maintain an output frequency of the generator at a commercial frequency of 50 Hz or 60 Hz. On the contrary, in the present invention, it is merely required that the generator 11 exhibits such output characteristics as described above, therefore, it is not necessarily required to control a rotational speed of the internal combustion engine so as to keep an output frequency of the generator at a commercial frequency. Thus, a rotational speed of the internal combustion engine may be controlled so as to keep a rotational speed of the generator at a level suitable for permitting the generator to exhibit the above-described output characteristics.

The generator incorporated in the conventional discharge lamp lighting device is generally controlled so as to keep an output voltage E at a substantially constant level Eo with respect to an output current I as indicated at a straight line (3) in FIG. 7. Thus, the prior art lacks such points a, b and c as described above, so that lighting of the discharge lamp by means of the generator requires to arrange a ballast between the generator and the discharge lamp.

On the contrary, such setting of output characteristics of the generator as described above in the present invention permits the operation points a, b and c necessary for lighting the discharge lamp to be obtained by merely applying an output of the generator directly or through the rectifier to the discharge lamp, so that the discharge lamp may be lighted without using any ballast.

The above-described construction of the present invention wherein an output of the generator is applied directly or through the rectifier to the discharge lamp contributes to an improvement in a power factor of load of the generator, to thereby lighten a burden on the generator, resulting in reducing fuel consumption of the internal combustion engine. Also, the present invention eliminates a necessity of arranging any phase advancing capacitor, to thereby prevent an excessive increase in output voltage of the generator by a magnetizing action of the generator due to a leading current of the phase advancing capacitor when the discharge lamp is lighted again after it is turned off once.

Such elimination of the ballast as described above prevents an inrush current of an increased level from flowing through the armature coil during starting, so that an increased lamp load may be driven while keeping the generator from being increased in capacity, resulting in down-sizing of the generator under the same lamp load conditions.

Such drooping characteristics as indicated at the curve (1) in FIG. 7 may be readily provided by suitably setting the number of windings of an armature coil of the generator 11. Alternatively, this may be likewise accomplished by suitably adjusting a polar arcuate angle or an angle of an arc defined by each of magnetic poles of each of a rotor and a stator so that when magnetic poles of the rotor and those of the stator are rendered opposite to each other, a leakage flux flowing through magnetic poles adjacent thereto is increased. In particular, when an AC magneto is used as the generator 11, adjustment of a polar arcuate angle of each of the magnetic poles of the stator for the purpose of increasing a leakage flux flowing through the adjacent magnetic poles when the magnetic poles of the stator and rotor are opposite to each other permits drooping characteristics passing through the points a, b and c in FIG. 7 to be readily provided.

Figure 5:
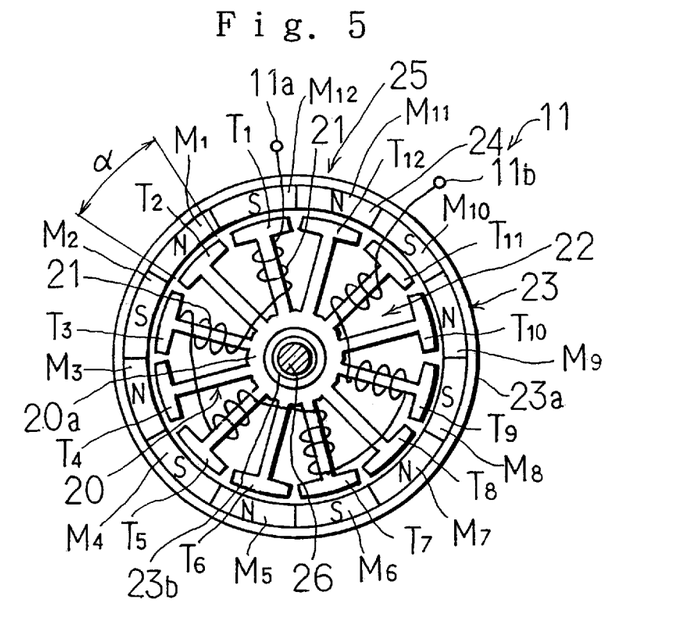
FIG. 5 is a schematic view showing an example of a generator suitable for use in the present invention.

FIG. 5 shows an example of an AC magneto which may be used as the generator 11, wherein the magneto or generator 11 includes a stator 22 and a magnet rotor 25. The stator 22 is constructed of a star core 20 including an annular yoke section 20a and a plurality of tooth sections T1 to T12 formed on the yoke section 20a so as to be projected therefrom and an armature coil 21 wound on each of the tooth sections of the core 20. In FIG. 5, twelve such tooth sections are arranged on the yoke section 20a. The magnet rotor 25 includes a flywheel 23 formed into a cup-like shape and a permanent magnet 24 fixed on an inner periphery of a peripheral wall section 23a of the flywheel 23. The permanent magnet 24 is magnetized into a predetermined number of poles, to thereby provide rotor magnetic poles M1 to M12. In the example of FIG. 5, twelve such magnetic poles are provided. The flywheel 23 is provided at a center of a bottom wall thereof with a boss 23b, which is mounted on a revolving shaft 26 of the engine, so that magnetic poles of the magnet rotor 25 are rendered opposite to magnetic pole sections defined at a distal end of the tooth sections T1 to T12 of the core 20 of the stator through a predetermined gap. In the example shown in FIG. 5, the armature coils 21 wound on the tooth sections T1, T3, - - - , T11 in odd numbers are connected in series to each other while being aligned in polarity with each other and output terminals 11a and 11b for connection to the discharge lamp are led out of both ends of a series circuit of the armature coils.

Likewise, the tooth sections T2, T4, - - - , T12 in even numbers each have an armature coil (not shown) wound thereon, which is used for driving a load other than the discharge lamp.

In the AC magneto shown in FIG. 5, adjustment of the number of windings of the armature coil 21 permits a magnitude or level of a non-load voltage Va and a ratio of a decrease in output voltage to an increase in output current to be suitably adjusted. Also, a ratio of a decrease in output voltage to an increase in output current may be increased by increasing a polar arcuate angle $\chi$ at the magnetic pole section at the distal end of each of the tooth sections of the core 20 of the stator to increase a leakage flux flowing through the adjacent magnetic pole sections of the stator when each of the magnetic pole sections of the stator is rendered opposite to each of the magnetic poles of the rotor. In FIG. 5, this may be accomplished, for example, by increasing a magnetic flux flowing from the magnetic pole M1 of the magnet through the magnetic pole section at the distal end of the tooth section T2 and the magnetic pole section at the distal end of the adjacent tooth section T3 to the magnetic pole M2.

Figure 6:
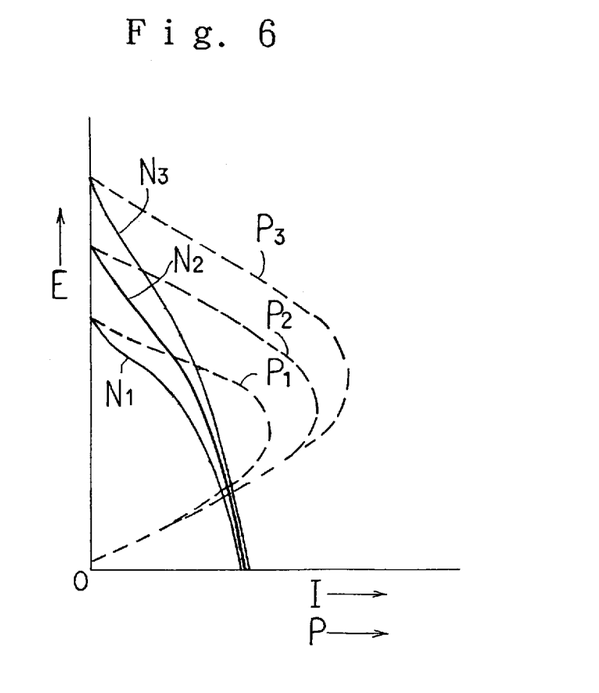
FIG. 6 is a graphical representation showing an example of characteristics of a magneto.

FIG. 6 shows an example of characteristics of the AC magneto, wherein curves N1, N2 and N3 indicate relationship between an output voltage E thereof and an output current I thereof obtained when a rotational speed of the magneto or generator is N1, N2 and N3 (N1<N2<N3), respectively. Also, curves P1, P2 and P3 indicate relationship between the output voltage E and an output P of the magneto obtained when the rotational speed is N1, N2 and N3, respectively.

The generator 11 is merely required to exhibit characteristics capable of passing through points a, b and c, therefore, it is not necessarily restricted to an AC magneto. For example, the generator 11 may be constituted by an induction generator wherein a magnet and armature coils are arranged on a side of a stator and an inductor is arranged on a side of a rotor, so that a variation in magnetic flux due to rotation of the inductor permits an AC voltage to be induced across the armature coils. Alternatively, a synchronous generator or a DC generator may be suitably used for this purpose.

Figure 3:
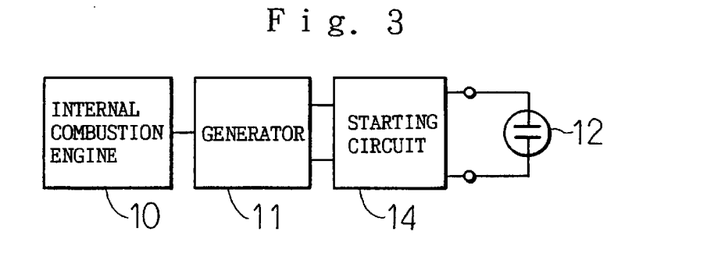
FIG. 3 is a schematic block diagram generally showing a further embodiment of a discharge lamp lighting device driven by an internal combustion engine according to the present invention.

The illustrated embodiment, as described above, is so constructed that an output voltage of the generator is applied directly or through the rectifier to the discharge lamp. Alternatively, when a discharge lamp increased in breakdown voltage such as, for example, a metal halide lamp or the like is to be lighted, a starting circuit 14 adapted to generate a high-voltage pulse during starting of the discharge lamp while using the generator as a power supply therefor may be arranged as shown in FIG. 3, so that an output pulse of the starting circuit 14 is applied to the discharge lamp while being added to or superposed on an output voltage of the generator 11. In this instance as well, output characteristics of the generator serve as drooping characteristics and are so set that an output voltage thereof at a non-load state thereof may have a magnitude or level sufficient to permit the starting circuit to generate a high-voltage pulse higher than a break-down voltage of the discharge lamp, a short-circuit current of the generator 11 may have a level sufficient to restrict a discharge current of the discharge lamp just after starting of the discharge to an allowable level or below, and a terminal voltage of the discharge lamp and a discharge current thereof at a steady state thereof each are kept within a rated range.

The starting circuit described above may include a capacitor charged by means of an output of the generator 11, a step-up transformer and a discharge circuit for discharging charges in the capacitor through a primary coil of the step-up transformer during starting of the discharge lamp, resulting in a high-voltage pulse being induced across a secondary coil of the step-up transformer due to discharge of the capacitor. An output voltage of the generator 11 is applied through the secondary coil of the step-up transformer to the discharge lamp.

Figure 4:
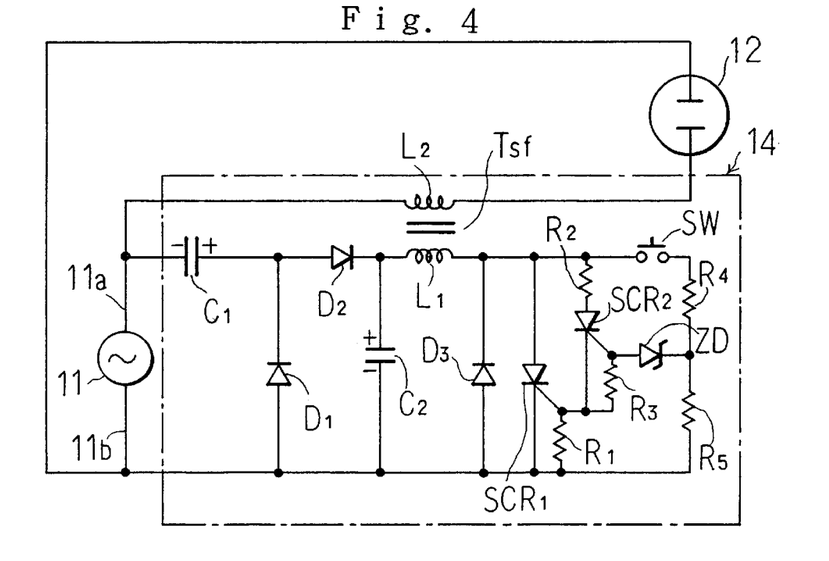
FIG. 4 is a circuit diagram showing an example of a starting circuit incorporated in the discharge lamp lighting device shown in FIG. 3.

The starting circuit incorporated in the embodiment shown in FIG. 3 may be constructed in such a manner as shown in FIG. 4. More particularly, a starting circuit of FIG. 4 includes a voltage doubler rectifying circuit widely known in the art which is constructed of capacitors C1 and C2 and diodes D1 and D2. A terminal of the input-side capacitor C1 on an input side thereof and a terminal of the output-side capacitor C2 on a low potential side thereof are connected to the output terminals 11a and 11b of the generator 11, respectively. A terminal of the output-side capacitor C2 of the voltage doubler rectifying circuit on a high potential side thereof is connected to one end of a primary coil L1 of a step-up transformer Tsf. Between the other end of the step-up transformer Tsf and the terminal of the capacitor C2 on the low potential side thereof is connected a thyristor SCR1 which is so arranged that an anode thereof faces the primary coil L1 of the step-up transformer Tsf. A resistor R1 is connected between a gate of the thyristor SCR1 and a cathode thereof, a diode D3 is connected in parallel between the anode of the thyristor SCR1 and the cathode thereof while keeping an anode thereof facing the cathode of the thyristor SCR1. The gate of the thyristor SCR1 is connected to a cathode of a thyristor SCR2 for trigger, of which an anode is connected through a resistor R2 to the other end of the primary coil L1 of the step-up transformer Tsf. A gate of the thyristor SCR2 is connected to an anode of a Zener diode ZD and a resistor R3 is connected between the gate of the thyristor SCR2 and the cathode thereof. Between the other end of the primary coil L1 of the step-up transformer and the terminal of the capacitor C2 on the lower potential side thereof is connected a resistance type potential dividing circuit through a starting switch SW. The resistance type potential dividing circuit is constituted by resistors R4 and R5. The Zener diode ZD has a cathode connected to a potential dividing point of the resistance type potential dividing circuit.

The step-up transformer also includes a secondary coil L2, of which an end is connected to a connection between the one output terminal 11a of the generator 11 and the input-side capacitor C1 of the voltage doubler rectifying circuit. Between the other end of the secondary coil L2 and the other output terminal 11b of the generator 11 is connected the discharge lamp 12 increased in starting voltage such as a metal halide lamp or the like.

The starting switch is constituted by a push button switch SW, which is so constructed that a contact thereof is closed during a period of time for which a push button is pushed.

The lighting device of FIG. 4 thus constructed, when the generator 11 generates a voltage, charging of the capacitor C2 is carried out with a polarity shown in FIG. 4 until a voltage twice as high as a crest value of an output voltage of the generator is obtained. When the starting switch SW is closed, the Zener diode is rendered conductive to trigger the thyristor SCR2, so that the thyristor SCR2 is turned on to feed the thyristor SCR1 with a trigger signal. This permits the thyristor SCR1 to be turned on, resulting in a discharge circuit for the capacitor C2 being provided, so that charges in the capacitor C2 are discharged through the primary coil of the step-up transformer Tsf and the thyristor SCR1. Such discharge causes a primary current of the step-up transformer Tsf to be varied, so that a high-voltage pulse is generated across the secondary coil L2 of the step-up transformer. The high-voltage pulse thus generated is applied to the discharge lamp 12 while being superposed on an output voltage of the generator 11, so that discharge of the discharge lamp 12 is started, resulting in the discharge lamp being lighted. After the discharge is thus started and the switch SW is rendered open, an output voltage of the generator 11 is applied through the secondary coil L2 of the step-up transformer to the discharge lamp 12, so that the discharge lamp 12 is kept lighted.

Figure 8:
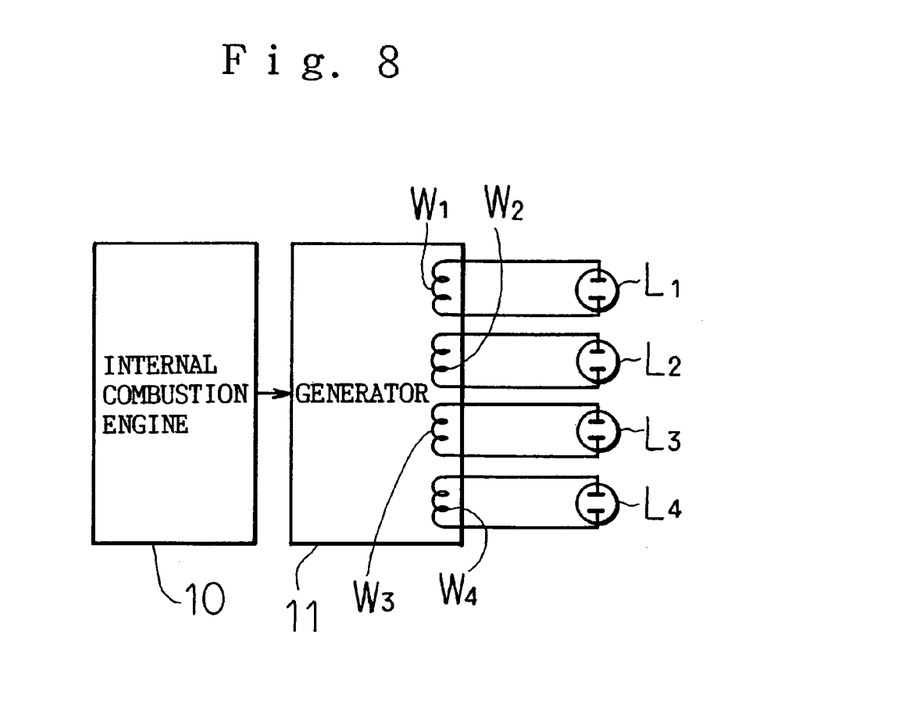
FIG. 8 is a schematic block diagram generally showing still another embodiment of a discharge lamp lighting device driven by an internal combustion engine according to the present invention, which is adapted to light a plurality of discharge lights.

Referring now to FIG. 8, a further embodiment of a discharge lamp lighting device according to the present invention is illustrated, which is adapted to light a plurality of discharge lamps. In FIG. 8, four such discharge lamps L1 to L4 are arranged. In the illustrated embodiment, a generator 11 includes first to fourth generating coils W1 to W4 for lighting the discharge lamps, which coils are arranged so as to be electrically independent from each other. Output voltages of the first to fourth discharge lamp lighting generating coils W1 to W4 are applied directly to the first to fourth discharge lamps L1 to L4, respectively. The generator may be either a DC generator or an AC generator.

The term "electrically independent from each other" used herein indicates that there is no electrical interference among a plurality of discharge lamp lighting generating coils or that a load current flowing through each of the discharge lamp lighting generating coils is kept from flowing to the other discharge lamp lighting generating coils or an output voltage of each of the discharge lamp lighting generating coils is kept from being applied to the other discharge lamp lighting generating coils.

Figure 9:
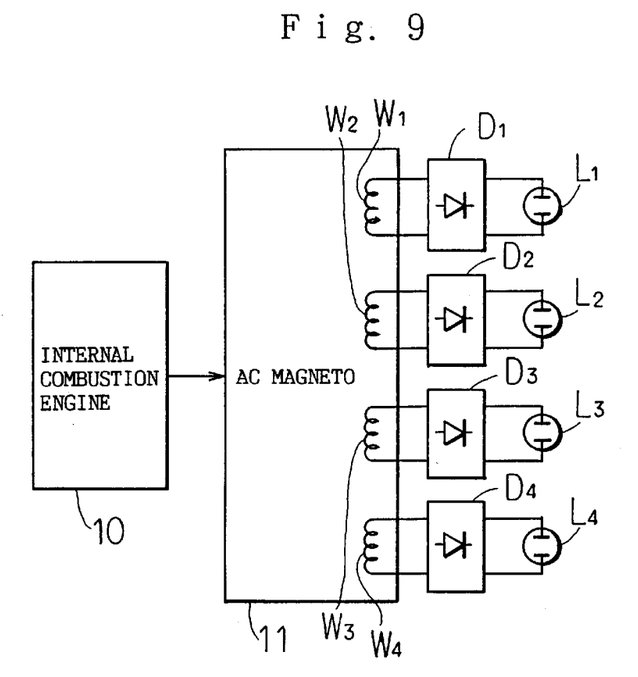
FIG. 9 is a schematic block diagram generally showing yet another embodiment of a discharge lamp lighting device driven by an internal combustion engine according to the present invention, which is adapted to light a plurality of discharge lights.

Referring now to FIG. 9, still another embodiment of a discharge lamp lighting device according to the present invention is illustrated, which is likewise adapted to light a plurality of discharge lamps. In the illustrated embodiment, a generator 11 comprises an AC magneto and is provided with first to fourth discharge lamp lighting generating coils W1 to W4 arranged so as to be electrically independent from each other, of which output voltages are applied through first to fourth rectifiers D1 to D4 to first to fourth discharge lamps L1 to L4.

In the lighting device shown in each of FIGS. 8 and 9, the generator 11 is so constructed that output characteristics of each of the discharge lamp lighting generating coils W1 to W4 exhibit drooping characteristics. The output characteristics of each of the discharge lamp lighting generating coils are so set that an output voltage of each of the discharge lamp lighting generating coils at a non-load state thereof may be higher than a break-down voltage of the discharge lamp, a short-circuit current of each of the discharge lamp lighting generating coils may have a magnitude or level sufficient to restrict a discharge current of the discharge lamp just after starting of discharge thereof to an allowable level or below, and a discharge voltage of the discharge lamp having an output voltage of each of the discharge lamp lighting generating coils applied thereto and a discharge current thereof which are obtained at a steady state thereof each are kept within a rated range.

Also, in each of the embodiments shown in FIGS. 8 and 9, a stator of the generator 11 is provided with a means for loosening coupling of magnetic circuits of the discharge lamp lighting generating coils W1 to W4 to each other, to thereby substantially prevent an armature reaction due to a current flowing through each of the discharge lamp lighting generating coils from affecting an output voltage of each of the other or remaining discharge lamp lighting generating coils.

The phrase "loosening coupling of magnetic circuits of a plurality of discharge lamp lighting generating coils to each other" indicates that magnetic coupling of a plurality of discharge lamp lighting generating coils to each other is rendered coarse or rough to a degree sufficient to permit a variation in voltage occurring in each of the discharge lamp lighting generating coils due to a load current flowing from each of the remaining discharge lamp lighting generating coils to the discharge lamp to be restrained to a range in which satisfactory lighting of the discharge lamp is ensured (or that each of the discharge lamp lighting generating coils is substantially kept from flowing of a magnetic flux interlinking the remaining discharge lamp lighting generating coils through the magnetic circuit thereof).

Figure 14:
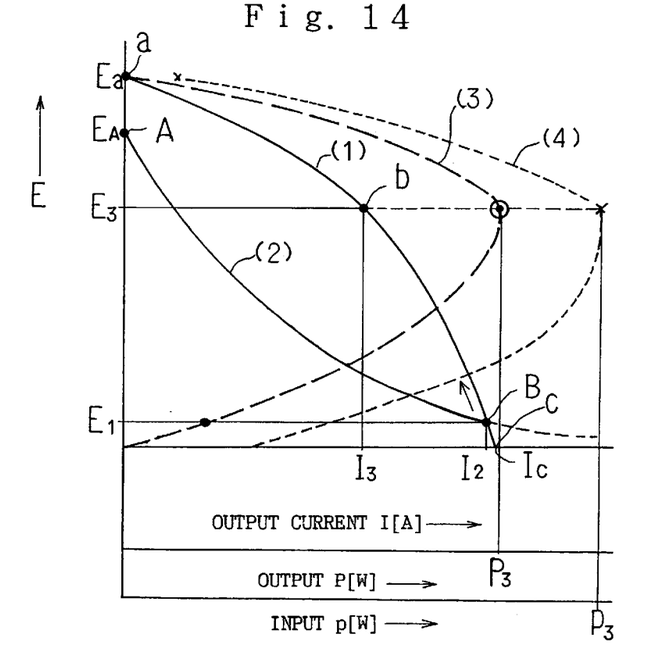
FIG. 14 is a graphical representation showing output-voltage to output-current characteristics of the generator shown in FIG. 11, output-voltage to output-power characteristics thereof, output-voltage to input characteristics thereof, and voltage to current characteristics of a discharge lamp at a cold state thereof.

Output-voltage E (V) to output-current I (A) characteristics of each of the discharge lamp lighting generating coils of the generator 11 incorporated in the lighting device shown in each of FIGS. 8 and 9 are indicated at a curve (1) in FIG. 14 and an example of relationship between a voltage across the discharge lamp and a discharge current thereof at a cold state thereof is indicated at a curve (2) in FIG. 14. Also, output-voltage E to output P (W) characteristics of the generator 11 are indicated at a curve (3) in FIG. 14 and an example of output-voltage E to input p (W) characteristics of the generator is indicated at a curve (4) in FIG. 14. The input p is an input of the generator per one discharge lamp lighting generating coil.

In the lighting device shown in each of FIGS. 8 and 9, a non-load voltage Ea generated by each of the discharge lamp lighting generating coils W1 to W4 of the generator 11 is set to be higher than a break-down voltage EA. Also, the output-voltage to output-current characteristics (characteristics of the curve (1)) of each of a plurality of the discharge lamp lighting generating coils W1 to W4 of the generator are permitted to exhibit drooping characteristics and so set that a short-circuit current Ic (a current at a point c in FIG. 14) of each of the discharge lamp lighting generating coils W1 to W4 may have a magnitude or level sufficient to restrict a discharge current of the discharge lamp (a current at a point B) just after starting of discharge thereof to a level allowable to the discharge lamp or below. Also, output characteristics of each of the discharge lamp lighting generating coils are set so that a voltage across each of the discharge lamps L1 to L4 having output voltages of the discharge lamp lighting generating coils W1 to W4 respectively applied thereto and a discharge current thereof which are obtained at a steady state thereof (for example, a voltage E3 and a current I3 at a point b in FIG. 14) each are within a rated range of the discharge lamp. In the example shown in FIG. 14, an output P of the generator at the stable point b in a steady state of the discharge lamp is indicated at P3 and an input p (an output of the internal combustion engine 10) required to obtain the output P is indicated at p3.

More specifically, output characteristics of each of the discharge lamp lighting generating coils W1 to W4 are set so as to permit the output-voltage to output-current characteristic curve (1) of each of the discharge lamp lighting generating coils W1 to W4 to pass through a point a and the points b and c. In this instance, a whole rated output of the generator is P3×4 and a rated output of the internal combustion engine is p3×4.

Also, in the present invention, magnetic coupling of the magnetic circuits of the discharge lamp lighting generating coils W1 to W4 to each other is loosened to a degree sufficient to restrict an influence which an armature reaction occurring when a load current (discharge current) flows through each of the discharge lamp lighting generating coils has on an output voltage of each of the remaining discharge lamp lighting generating coils to a range in which satisfactory lighting of the discharge lamp is ensured. In other words, the magnetic coupling is loosened to a degree sufficient to restrict a variation in output voltage which flowing of a discharge current through each of the discharge lamp lighting generating coils causes in the remaining discharge lamp lighting generating coils to a range in which satisfactory lighting of the discharge lamp is ensured. In general, in order to ensure satisfactory lighting of the discharge lamp, it is required to restrict a variation in voltage across the discharge lamp to a range of ±5 to 6%.

The above-described construction of the present invention wherein the generator is provided with a plurality of the discharge lamp lighting generating coils W1 to W4 electrically independent from each other and the discharge lamps L1 to L4 are driven separately from each other by the discharge lamp lighting generating coils prevents overloading of the internal combustion engine 10 and generator 11 during starting of the discharge lamps, to thereby reduce a variation in voltage applied to each of the discharge lamps, resulting in ensuring satisfactory lighting of the discharge lamps.

Also, when coupling of the magnetic circuits of the plural discharge lamp lighting generating coils to each other is loosened, an influence which a drive current flowing through each of the discharge lamp lighting generating coils has on an output voltage of each of the remaining discharge lamp lighting generating coils is decreased, resulting in the plural discharge lamps being stably lighted.

Figure 11:
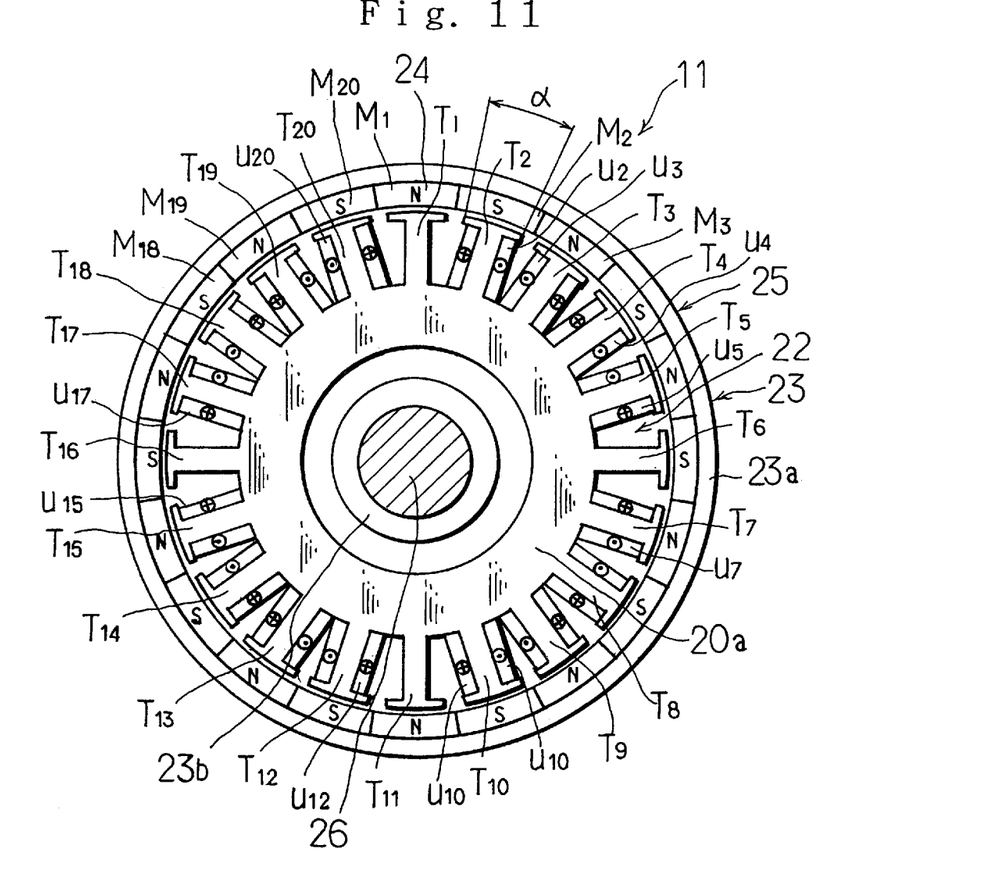
FIG. 11 is a schematic view showing an example of a generator suitable for use for lighting a plurality of discharge lamps in a discharge lamp lighting device driven by an internal combustion engine according to the present invention.

FIG. 11 shows an example of an AC magneto suitable for use in the lighting device shown in each of FIGS. 8 and 9. A magneto or generator shown in FIG. 11 includes a stator 22 and a magnet rotor 25. The stator 22 is constructed of a stator core 20 including an annular yoke section 20a and a plurality of tooth sections T1 to T20 formed at equal angular intervals on an outer periphery of the yoke section 20a, as well as unit coils u2, u3, - - - wound on selected tooth sections T2, T3, - - - of the stator core 20. In FIG. 11, twenty such tooth sections are arranged on the yoke section 20a. The magnet rotor 25 includes a flywheel 23 formed into a cup-like shape and a permanent magnet 24 annularly fixed on an inner periphery of a peripheral wall section 23a of the flywheel 23, wherein the permanent magnet 24 is magnetized into a predetermined number of poles, to thereby provide rotor magnetic poles M1 to M20. In the example of FIG. 11, twenty such poles magnetized are provided.

The flywheel 23 is provided on a center of a bottom wall thereof with a boss 23b, which is mounted on a revolving shaft 26 of the engine. The stator 22 is fixed on a stator mounting section arranged on a casing of the internal combustion engine 10 or the like, so that magnetic poles M1 to M20 of the magnet rotor 25 are rendered opposite through a predetermined gap to magnetic pole sections defined at a distal end of the tooth sections T1 to T20 of the core 20 of the stator.

In the example shown in FIG. 11, of the twenty tooth sections provided on the stator core, the sixteen tooth sections each have the unit coil wound thereon. Four unit coils respectively wound on each four tooth sections successively arranged in a circumferential direction of the stator cooperate with each other to constitute each one unit coil group. Thus, the sixteen unit coils are divided into four unit coil groups, each of which provides each discharge lamp lighting generating coil.

More specifically, the unit coils us to u5 respectively wound on the tooth sections T2 to T5 of the stator core constitute one unit coil group and are connected in series to each other while keeping polarities of the unit coils aligned with each other or while permitting voltages induced across the unit coils to be added to each other, so that the first discharge lamp lighting generating coil W1 shown in each of FIGS. 1 and 2 is provided.

Figure 12:
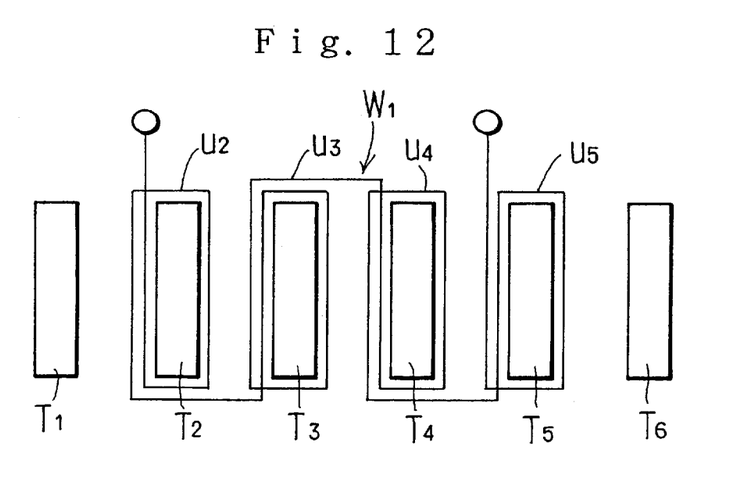
FIG. 12 is a development view showing an essential part of the generator of FIG. 11 on a side of a stator thereof.

FIG. 12 is a development view showing the unit coils u2 to u5 which cooperate together to provide the first discharge lamp lighting generating coil W1 of the stator 22, wherein an end of the unit coil u2 wound on the tooth section T2 is extended to the tooth section T3 and then wound on the tooth section T3 in a direction different from that of winding on the tooth section T2, to thereby provide the unit coil u3. Then, an end of the unit coil u3 wound on the tooth section T3 is likewise extended to the tooth section T4 and then wound on the tooth section T4 in a direction different from that of winding on the tooth section T3, to thereby provide the unit coil u4. Thereafter, an end of the unit coil u4 thus wound on the tooth section T4 is extended to the tooth section T5 and then wound on the tooth section T5 in a direction different from that of winding on the tooth section T4, to thereby provide the unit coil u5.

Likewise, the unit coils u7 to u10 are respectively wound on the tooth sections T7 to T10 of the stator core in order in directions alternately different from each other to constitute another unit coil group and then connected in series to each other, resulting in the second discharge lamp lighting generating coil W2 shown in each of FIGS. 8 and 9 being provided. Further, the unit coils u12 to u15 are respectively wound on the tooth sections T12 to T15 of the stator core in order in directions alternately different from each other to constitute a further unit coil group and then connected in series to each other, resulting in the third discharge lamp lighting generating coil W3 shown in each of FIGS. 8 and 9 being provided.

Moreover, the unit coils u17 to u20 are respectively wound on the tooth sections T17 to T20 of the stator core in order in directions alternately different from each other to constitute still another unit coil group and then connected in series to each other, resulting in the fourth discharge lamp lighting generating coil W4 being provided.

In the generator shown in FIG. 11, the coil-free tooth sections T1, T6, T11 and T16 on which no coil is wound are interposedly arranged between the unit coil groups constituting the discharge lamp lighting generating coils W1 to W4. The coil-free tooth sections T1, T6, T11 and T16 thus arranged function to loosen coupling of the magnetic circuits of the adjacent discharge lamp lighting generating coils to each other.

In FIG. 11, the unit coils each have an indication comprising a black dot enclosed with a circle or a mark + enclosed with a circle formed thereon. Such an indication designates a direction of a current flowing through each unit coil in a moment. More specifically, the black dot indicates that a current flows from a back side of the sheet of FIG. 11 toward a front side thereof, whereas the mark + indicates that it flows from the front side toward the back side.

In the AC magneto shown in FIG. 11, adjustment of the number of windings of the unit coils u2, u3, - - - permits a magnitude or level of a non-load voltage Va and a ratio of a decrease in output voltage to an increase in output current to be suitably adjusted. Also, a ratio of a decrease in output voltage to an increase in output current may be increased by increasing a polar arcuate angle of the magnetic pole section at the distal end of each of the tooth sections of the core 20 of the stator to increase a leakage flux flowing through each of the adjacent magnetic pole sections of the stator when each of the magnetic pole sections of the stator is rendered opposite to each of the magnetic poles of the rotor. In FIG. 11, this may be accomplished, for example, by increasing a magnetic flux flowing from the magnetic pole M2 of the magnet through the magnetic pole section at the distal end of the tooth section T2 and the magnetic pole section at the distal end of the adjacent tooth section T3 to the magnetic pole M3.

In the example described above, the number of tooth sections of the stator is set to be equal to the number of poles of the rotor. Alternatively, both may be different from each other. In general, when n (n: an integer) discharge lamps are to be lighted, a stator is constructed of a stator core having m (m: an integer, m≧n) tooth sections arranged in a circumferential direction of the rotor and k (k: an integer integral times as large as n, k≦m) discharge lamp lighting unit coils respectively wound on k tooth sections of the stator core. The k unit coils thus provided are divided into n unit coil groups while defining p (p: an integer, p=k/n) unit coils respectively wound on p tooth sections successively arranged in a circumferential direction of the stator as each one unit coil group, so that n discharge lamp lighting generating coils electrically independent from each other which are adapted to respectively separately drive n discharge lamps may be provided.

The generator shown in FIG. 11, as described above, is so constructed that the coil-free tooth sections on which no coil is wound are interposedly arranged between portions of the core adjacent to each other on which the unit coil groups respectively constituting the discharge lamp lighting generating coils of the stator core are wound, to thereby loosen coupling between the magnetic circuits of the discharge lamp lighting generating coils adjacent to each other. Alternatively, the generator may be constructed in such a manner that a magnetic space or gap may be provided between each adjacent two portions of the core on which the unit coil groups respectively constituting the discharge lamp lighting generating coils of the stator core are wound, to thereby loosen coupling between the magnetic circuits of the discharge lamp lighting generating coils adjacent to each other.

Figure 13:
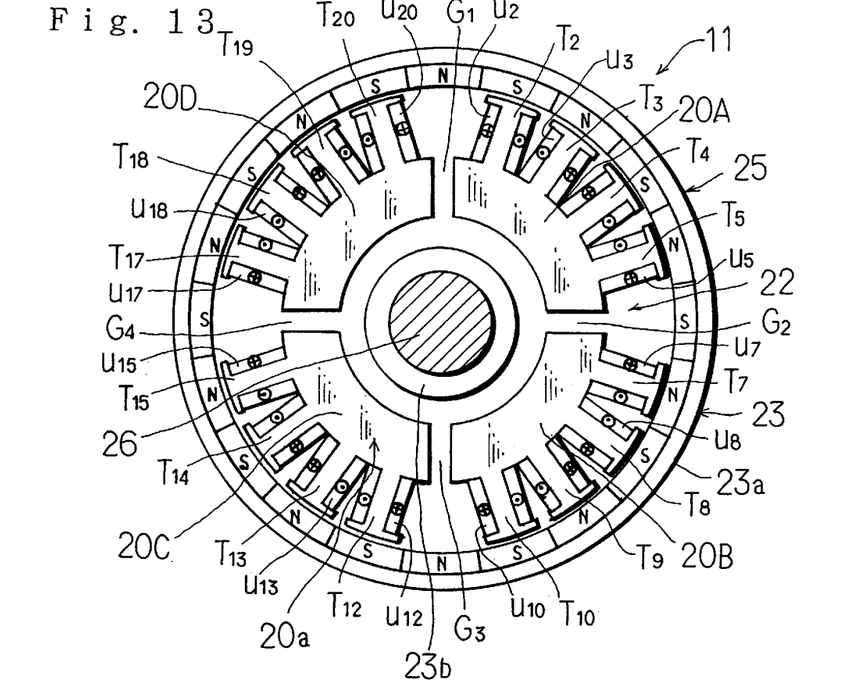
FIG. 13 is a schematic view showing another example of a generator suitable for use for lighting a plurality of discharge lamps in a discharge lamp lighting device driven by an internal combustion engine according to the present invention.

FIG. 13 shows another example of a generator suitable for use for lighting a plurality of discharge lamps, which is so constructed that a magnetic gap is provided between each adjacent two portions of a core on which unit coil groups respectively constituting discharge lamp lighting generating coils of a stator core are wound, to thereby loosen coupling between magnetic circuits of the discharge lamp lighting generating coils adjacent to each other. In the generator of FIG. 13, tooth sections like those T1, T6, T11 and T16 arranged in the generator shown in FIG. 11 are eliminated from a stator core 20 and substitutionally magnetic gaps G1 to G4 are defined at portions of the stator core 20 in a manner to positionally correspond to the tooth sections T1, T6, T11 and T16, so that the stator core 20 is divided into four separate cores 20A to 20D. The remaining part of the generator may be constructed in substantially the same manner as that shown in FIG. 11.

The term "magnetic gap" or "magnetic space" used herein indicates a part acting as an air gap with respect to a magnetic flux. Thus, the gap may be filled with a non-magnetic material.

The generator which may be incorporated in the lighting device of the present invention is not limited to any specific structure so long as it exhibits output characteristics capable of passing through the points a, b and c in FIG. 14. Thus, it is never limited to an AC magneto. For example, an induction generator wherein a magnet and armature coils are arranged on a side of a stator and an inductor is arranged on a side of a rotor, so that an AC voltage is induced across the armature coils due to a variation in magnetic flux occurring by rotation of the inductor may be conveniently used as the generator. Alternatively, a synchronous generator, a DC generator or the like may be likewise used for this purpose.

Figure 10:
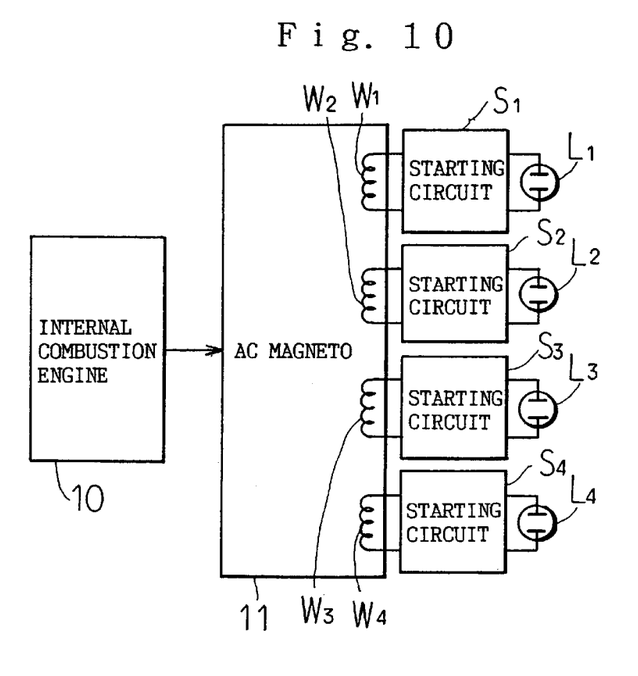
FIG. 10 is a schematic block diagram generally showing a still further embodiment of a discharge lamp lighting device driven by an internal combustion engine according to the present invention, which is adapted to light a plurality of discharge lights.

The lighting device illustrated in FIG. 8 is adapted to apply an output voltage of each of the discharge lamp lighting generating coils directly to the discharge lamp and the device of FIG. 9 is adapted to apply the output voltage through the rectifier to the discharge lamp. Alternatively, when a discharge lamp increased in break-down voltage such as a metal halide lamp or the like is to be lighted, the lighting device of the present invention is preferably constructed in such a manner as shown in FIG. 10. More particularly, starting circuits S1 to S4 are provided which are adapted to generate a high-voltage pulse during starting of the discharge lamps L1 to L4 while using the discharge lamp lighting generating coils W1 to W4 of the generator as power supplies therefor, so that the output pulses of the starting circuits S1 to S4 are applied to the discharge pulses L1 to L4 while being superposed on output voltages of the discharge lamp lighting generating coils W1 to W4, respectively.

In this instance, the generator is so constructed that output-voltage to output-current characteristics of each of the discharge lamp lighting generating coils of the generator 11 exhibit as drooping characteristics thereof and output-voltage to output-current characteristics of the generator 11 are so set that an output voltage of each of the discharge lamp lighting generating coils at a non-load state thereof may have a magnitude or level sufficient to permit the starting circuit to generate a high-voltage pulse higher than a break-down voltage of the discharge lamp, a short-circuit current thereof may have a magnitude or level sufficient to restrict a discharge current of the discharge lamp just after starting of discharge thereof to an allowable level or below, and a voltage across the discharge lamp and a discharge current thereof at a steady state thereof each are kept within a rated range.

The starting circuits S1 to S4 each may be constructed in a manner like the starting circuit S shown in FIG. 4.

The above description has been made in connection with lighting of four discharge lamps. In general, the present invention may be effectively applied to lighting of a plurality of discharge lamps. For example, the generator shown in FIG. 11 may be conveniently applied to lighting of two discharge lamps while using the generating coil W1 consisting of the unit coils u2 to u5 and the generating coil W3 consisting of the unit coils u12 to u15 as discharge lamp lighting generating coils, respectively. When only a part of the plural generating coils constructed of the unit coils connected together is used as the discharge lamp lighting generating coils, the generating coils arranged at positions spaced from each other at a distance as long as possible may be preferably used as the discharge lamp lighting generating coils. In this case, the remaining two generating coils W2 and W4 which are not used as the discharge lamp lighting generating coils may be used for driving different loads such as incandescent lamp and the like.

In the example shown in each of FIGS. 11 and 13, an AC magneto provided with a stator of which the number of poles is twenty is used as the generator on which the discharge lamp lighting generating coils are arranged by way of example. However, the generator is not limited to such a specific structure. It is merely required that the number m of poles (or the number of unit coils) of the stator of the generator is larger than the number n of discharge lamps to be lighted.

The discharge lamp lighting generator is so constructed that each one coil-free tooth section is arranged between each adjacent two magnetic circuits of the plural discharge lamp lighting generating coils. Alternatively, two such coil-free tooth sections may be arranged therebetween.

In the above description, the discharge lamp lighting generating coils each are constructed of four unit coils. However, the number of unit coils for each of the discharge lamp lighting generating coils may be determined as desired.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A discharge lamp lighting device for lighting a plurality of discharge lamps, comprising:

a generator including a multipolar rotor driven by an internal combustion engine and a stator having a plurality of discharge lamp lighting generating coils arranged in a manner to be electrically independent from each other;

said plurality of discharge lamp lighting generating coils of said generator outputting voltages fed to said discharge lamps, respectively;

said stator of said generator including a means for loosening coupling of said plurality of discharge lamp lighting generating coils to each other in order to restrain an armature reaction which causes said plurality of discharge lamp lighting generating coils to act on each other;

said plurality of discharge lamp lighting generating coils each having output-voltage to output-current characteristics exhibiting drooping characteristics wherein an output voltage of each of said plurality of discharge lamp lighting generating coils is reduced with an increase in output current thereof;

said output-voltage to output-current characteristics of each of said plurality of discharge lamp lighting generating coils being so set that an output voltage of each of said plurality of discharge lamp lighting generating coils at a non-load state thereof may be higher than a break-down voltage of said discharge lamp, a short-circuit current thereof may have a level sufficient to restrict a discharge current of said discharge lamp just after starting of discharge thereof to an allowable level or below, and a voltage across said discharge lamp and a discharge current thereof at a steady state thereof each are kept within a rated range.

2. A discharge lamp lighting device for lighting n (n: an integer of 2 or more) discharge lamps, comprising:

a generator including a multipolar rotor driven by an internal combustion engine and a stator which includes a stator core having m (m: an integer, m≧n) tooth sections arranged in a circumferential direction of said rotor and k (k: an integer integral times as large as n, k≦m) discharge lamp lighting unit coils respectively wound on k tooth sections of said stator core;

said k unit coils of said generator being divided into n unit coil groups each consisting of p (p: an integer, P=k/n) unit coils respectively wound on p tooth sections of said stator successively arranged in the circumferential direction, said n unit coil groups respectively constituting n discharge lamp lighting generating coils;

said n discharge lamp lighting generating coils of said generator outputting voltages applied to said n discharge lamps, respectively;

said m tooth sections including coil-free tooth sections on which no coil is wound and which are arranged between portions of said stator core adjacent to each other on which said n unit coil groups constituting said n discharge lamp lighting generating coils are wound, so that coupling of magnetic circuits of said n discharge lamp lighting generating coils to each other is loosened;

said n discharge lamp lighting generating coils each having output-voltage to output-current characteristics exhibiting drooping characteristics wherein an output voltage of each of said n discharge lamp lighting generating coils is reduced with an increase in output current thereof;

said output-voltage to output-current characteristics of each of said n discharge lamp lighting generating coils being so set that an output voltage of each of said n discharge lamp lighting generating coils at a non-load state thereof may be higher than a break-down voltage of said discharge lamp, a short-circuit current thereof may have a level sufficient to restrict a discharge current of said discharge lamp just after starting of discharge thereof to an allowable level or below, and a voltage across said discharge lamp and a discharge current thereof at a steady state thereof each are kept within a rated range.

3. A discharge lamp lighting device for lighting n (n: an integer of 2 or more) discharge lamps, comprising:

a generator including a multipolar rotor driven by an internal combustion engine and a stator which includes a stator core having m (m: an integer, m≧n) tooth sections arranged in a circumferential direction of said rotor and k (k: an integer integral times as large as n, k≦m) discharge lamp lighting unit coils respectively wound on k tooth sections of said stator core;

said k unit coils of said generator being divided into n unit coil groups each consisting of p (p: an integer, P=k/n) unit coils respectively wound on p tooth sections of said stator successively arranged in the circumferential direction, said n unit coil groups respectively constituting n discharge lamp lighting generating coils;

said n discharge lamp lighting generating coils of said generator outputting voltages applied to said n discharge lamps, respectively;

said stator core being provided between portions thereof adjacent to each other on which said n unit coil groups constituting said n discharge lamp lighting generating coils are wound with magnetic gaps, respectively, so that coupling of magnetic circuits of said n discharge lamp lighting generating coils to each other is loosened;

said n discharge lamp lighting generating coils each having output-voltage to output-current characteristics exhibiting drooping characteristics wherein an output voltage of each of said n discharge lamp lighting generating coils is reduced with an increase in output current thereof;

said output-voltage to output-current characteristics of each of said n discharge lamp lighting generating coils being so set that an output voltage of each of said n discharge lamp lighting generating coils at a non-load state thereof may be higher than a break-down voltage of said discharge lamp, a short-circuit current thereof may have a level sufficient to restrict a discharge current of said discharge lamp just after starting of discharge there of to an allowable level or below, and a voltage across said discharge lamp and a discharge current thereof at a steady state thereof each are kept within a rated range.

4. A discharge lamp lighting device for lighting n (n: an integer of 2 or more) discharge lamps, comprising:

a generator including a multipolar rotor driven by an internal combustion engine and a stator which includes a stator core having m (m: an integer, m>n) tooth sections arranged in a circumferential direction of said rotor and k (k: an integer integral times as large as n, k≦m) discharge lamp lighting unit coils respectively wound on k tooth sections of said stator core; and n starting circuits respectively arranged in correspondence to said n discharge lamps and each generating a high-voltage pulse during starting of each of said n discharge lamps;

said k unit coils of said generator being divided into n unit coil groups each consisting of p (p: an integer, P=k/n) unit coils respectively wound on p tooth sections of said stator successively arranged in the circumferential direction, said n unit coil groups respectively constituting n discharge lamp lighting generating coils;

said n discharge lamp lighting generating coils outputting voltages applied to said n discharge lamps together with high voltage pulses generated by said n starting circuits, respectively;

said m tooth sections including coil-free tooth sections on which no coil is wound and which are arranged between portions of said stator core adjacent to each other on which said n unit coil groups constituting said n discharge lamp lighting generating coils are wound, so that coupling of magnetic circuits of said n discharge lamp lighting generating coils to each other is loosened;

said n discharge lamp lighting generating coils each having output-voltage to output-current characteristics exhibiting drooping characteristics wherein an output voltage of each of said n discharge lamp lighting generating coils is reduced with an increase in output current thereof;

said output-voltage to output-current characteristics of each of said n discharge lamp lighting generating coils being so set that an output voltage of each of said n discharge lamp lighting generating coils at a non-load state thereof may be higher than a break-down voltage of said discharge lamp, a short-circuit current thereof may have a level sufficient to restrict a discharge current of said discharge lamp just after starting of discharge there of to an allowable level or below, and a voltage across said discharge lamp and a discharge current thereof at a steady state thereof each are kept within a rated range.

5. A discharge lamp lighting device for lighting n (n: an integer of 2 or more) discharge lamps, comprising:

a generator including a multipolar rotor driven by an internal combustion engine and a stator which includes a stator core having m (m: an integer, m≧n) tooth sections arranged in a circumferential direction of said rotor and k (k: an integer integral times as large as n, k≦m) discharge lamp lighting unit coils respectively wound on k tooth sections of said stator core; and n starting circuits respectively arranged in correspondence to said n discharge lamps and generating high voltage pulses during starting of said n discharge lamps;

said k unit coils of said generator being divided into n unit coil groups each consisting of p (p: an integer, P=k/n)

unit coils respectively wound on p tooth sections of said stator successively arranged in the circumferential direction, said n unit coil groups respectively constituting n discharge lamp lighting generating coils;

said n starting circuits each including a capacitor charged by means of an output of said n discharge lamp lighting generating coil corresponding thereto, a step-up transformer and a discharge circuit for discharging charges in said capacitor through a primary coil of said step-up transformer during lighting of the discharge lamp corresponding thereto, so that a high-voltage pulse is induced across a secondary coil of said step-up transformer due to discharge of charges in said capacitor;

said n discharge lamp lighting generating coils outputting voltages which are applied through said secondary coils of said step-up transformers of said n starting circuits to said n discharge lamps, respectively;

said stator core being provided between portions thereof adjacent to each other on which said n unit coil groups constituting said n discharge lamp lighting generating coils are wound with magnetic gaps, respectively, so that coupling of magnetic circuits of said n discharge lamp lighting generating coils to each other is loosened;

said n discharge lamp lighting generating coils each having output-voltage to output-current characteristics exhibiting drooping characteristics wherein an output voltage of each of said n discharge lamp lighting generating coils is reduced with an increase in output current thereof;

said output-voltage to output-current characteristics of each of said n discharge lamp lighting generating coils being so set that an output voltage of each of said n discharge lamp lighting generating coils at a non-load state thereof may be higher than break-down voltage of said discharge lamp, a short-circuit current thereof may-have a level sufficient to restrict a discharge current of said discharge lamp just after starting of discharge thereof to an allowable level or below, and a voltage across said discharge lamp and a discharge current thereof at a steady state thereof are kept within a rated range.

* * * * *

UNITED STATES PATENT AND TRADEMARK OFFICE
CERTIFICATE OF CORRECTION

PATENT NO. : 6,094,011
DATED : July 25, 2000
INVENTOR(S) : Notsu

It is certified that error appears in the above-indentified patent and that said Letters Patent is hereby corrected as shown below:

Column 2, Line 23, delete "+6%" and insert --±6%--.

Column 18, Line 9, delete "m>n" and insert --m≥n--.

Signed and Sealed this

Tenth Day of April, 2001

Attest:

NICHOLAS P. GODICI

Attesting Officer     Acting Director of the United States Patent and Trademark Office